(12) United States Patent
Couse et al.

(10) Patent No.: US 9,007,421 B2
(45) Date of Patent: Apr. 14, 2015

(54) CONFERENCE CALL USER INTERFACE AND METHODS THEREOF

(75) Inventors: Peter Francis Couse, Ottawa (CA); Vincent Somoza, Woodlawn (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 777 days.

(21) Appl. No.: 13/134,922

(22) Filed: Jun. 21, 2011

(65) Prior Publication Data

US 2012/0327173 A1 Dec. 27, 2012

(51) Int. Cl.
*H04N 7/14* (2006.01)
*H04M 3/42* (2006.01)
*H04L 12/18* (2006.01)
*H04N 7/15* (2006.01)
*H04L 12/58* (2006.01)

(52) U.S. Cl.
CPC .......... *H04L 12/1822* (2013.01); *H04N 7/157* (2013.01); *H04N 7/15* (2013.01); *H04N 7/141* (2013.01); *H04L 12/1827* (2013.01); *H04L 12/5805* (2013.01)

(58) Field of Classification Search
CPC ......... H04N 7/14; H04N 7/141; H04N 7/142; H04N 7/144; H04N 7/147; H04N 7/148; H04N 7/15; H04N 7/152; H04N 7/155; H04N 7/157; H04L 12/1822; H04L 12/1827; H04L 12/5805
USPC .......... 348/14.01, 14.02, 14.03, 14.04, 14.05, 348/14.06, 14, 7, 14.08, 14.09, 14.1, 14.11, 348/14.12, 14.13, 14.14, 15.15, 14.16
See application file for complete search history.

(56) References Cited

U.S. PATENT DOCUMENTS

| | | | |
|---|---|---|---|
| 2008/0100693 A1* | 5/2008 | Jobs et al. | 348/14.07 |
| 2008/0136898 A1* | 6/2008 | Eisenberg et al. | 348/14.09 |
| 2008/0136899 A1* | 6/2008 | Eisenberg et al. | 348/14.09 |
| 2009/0079816 A1* | 3/2009 | Qvarfordt et al. | 348/14.16 |
| 2009/0098911 A1* | 4/2009 | Kim et al. | 455/566 |
| 2009/0199111 A1 | 8/2009 | Emori et al. | |
| 2009/0210789 A1 | 8/2009 | Thakkar et al. | |
| 2009/0303984 A1* | 12/2009 | Clark et al. | 370/352 |
| 2010/0040217 A1 | 2/2010 | Aberg et al. | |
| 2010/0073454 A1* | 3/2010 | Lovhaugen et al. | 348/14.03 |
| 2011/0085016 A1* | 4/2011 | Kristiansen et al. | 348/14.03 |
| 2011/0216674 A1* | 9/2011 | McDonald et al. | 370/260 |
| 2011/0234746 A1* | 9/2011 | Saleh et al. | 348/14.03 |
| 2011/0239130 A1* | 9/2011 | Lindley | 715/751 |
| 2011/0273526 A1* | 11/2011 | Mehin et al. | 348/14.01 |
| 2011/0317593 A1* | 12/2011 | Bonkowski et al. | 370/260 |

(Continued)

FOREIGN PATENT DOCUMENTS

EP 2180674 A1 4/2010
EP 2237533 A1 10/2010

*Primary Examiner* — Khai N Nguyen (57) ABSTRACT

This disclosure relates to a conference call user interface and methods thereof. In one illustrative embodiment, the user interface provides a simple teleconferencing solution that allows a user to establish a conference as well as an individual conversation. Graphical representations, in the form of avatars, can be provided. A table surrounded by the avatars can be used to mimic a meeting room as though the parties were actually there. When phone icons on the chests of the avatars are actuated, a directory application to search for parties can be provided. A consult line, separate from the avatars, can also be provided. After connecting and associating the parties with an avatar, call handling actions can be displayed on or around each of the avatars.

6 Claims, 5 Drawing Sheets

(56) References Cited

U.S. PATENT DOCUMENTS

| | | | |
|---|---|---|---|
| 2012/0062688 A1* | 3/2012 | Shen et al. | 348/14.03 |
| 2012/0188277 A1* | 7/2012 | Hebbar et al. | 345/629 |
| 2012/0204119 A1* | 8/2012 | Lefar et al. | 715/756 |

* cited by examiner

CONFERENCE CALL USER INTERFACE AND METHODS THEREOF

TECHNICAL FIELD

This disclosure generally relates to collaborative meetings, and more particularly, to a user interface in a conference room solution that facilitates meetings through the display of graphical representations of users situated around a table to handle call actions.

BACKGROUND

In businesses, conference room solutions are a must particularly when a large number of meetings are often required. Voice over Internet Protocol (VoIP) conference phones provide the ability to conference multiple parties together from an audio perspective. With next generation technologies, the ability to also conference multiple parties together from a video perspective can be offered. Conference phones, however, typically offer a very limited user interface for setting up conference calls. Some have small displays that provide feedback but users are forced to deal with a button interface that is typically not intuitive.

This is further compounded by the fact that a conference phone is most often a common use device found in a meeting room, which means users do not benefit from frequent repeated use as they would with their desk phone. With the use of a larger touch screen display, a more intuitive graphical user interface (GUI) can be provided that enables an infrequent user of a meeting room conference phone to easily discover how to set up a multi-party audio or video conference call.

Meeting room conference phones typically provide a simple telephone interface made up of a dialpad, hard keys such as mute, volume and redial. Some offer a small display and soft keys that work with the display to offer context sensitive buttons to aid in setting up a conference call. Often, however, this type of interface is inadequate for setting up and managing a conference call of more than three parties that includes the ability to escalate participants to video.

A system and method is therefore needed to provide a GUI that overcomes the above-described challenges. At the same time, the GUI should be intuitive and user friendly so that handling conference calls can be easily accomplished. These, as well as other related advantages and features, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

Generally described, the present disclosure relates to conferences. More specifically, this disclosure relates to a conference call user interface and methods thereof. In one illustrative embodiment, the user interface provides a simple teleconferencing solution that allows a user to establish a conference as well as an individual conversation. Graphical representations, in the form of avatars, can be provided. A table surrounded by the avatars can be used to mimic a meeting room as though the parties were actually there. When phone icons on the chests of the avatars are actuated, a directory application to search for parties can be provided. A consult line, separate from the avatars, can also be provided. After connecting and associating the parties with an avatar, call handling actions can be displayed on or around each of the avatars.

Numerous advantages can be offered by the illustrative embodiment described above. An intuitive way of handling presentations along with audio and video feeds from multiple parties is provided. The conference call user interface provides a friendly environment for establishing connections. The phone icons provided on the chests of the avatars can also offer a very instinctive way of establishing these connections. By removing convoluted functions common within today's conferencing devices, the user interface provides a more workable solution to those who are not familiar with the device. Many additional advantages of the present disclosure will become apparent to those skilled in the relevant art as provided for in the following description.

Before describing embodiments of the present disclosure, an exemplary collaboration appliance will be described in FIG. 1 with hardware and software of the appliance provided in FIG. 2. Thereafter, FIGS. 3 through 7 will provide exemplary aspects of the conference call user interface. The different displays are provided for illustrative purposes and should not be construed as the only aspects of the conference call user interface. In addition, while the term user is described throughout the present disclosure to describe someone who manages and operates the collaboration appliance, those skilled in the relevant art will appreciate that other terminologies can be used, for example, an administrator.

The technology described herein can be implemented as logical operations and/or modules in the collaboration appliance. The logical operations can be implemented as a sequence of processor-implemented steps executing in one or more computer systems and as interconnected machine or circuit modules within one or more computer systems. Likewise, the descriptions of various component modules can be provided in terms of operations executed or effected by the modules. The resulting implementation is a matter of choice, dependent on the performance requirements of the underlying environment in which the described disclosure is implemented. The logical operations making up the embodiment of the disclosure described herein are referred to variously as operations, steps, objects, or modules. It should be understood that logical operations can be performed in any order, unless explicitly claimed otherwise or a specific order is inherently necessitated by the claim language.

Figure 1:
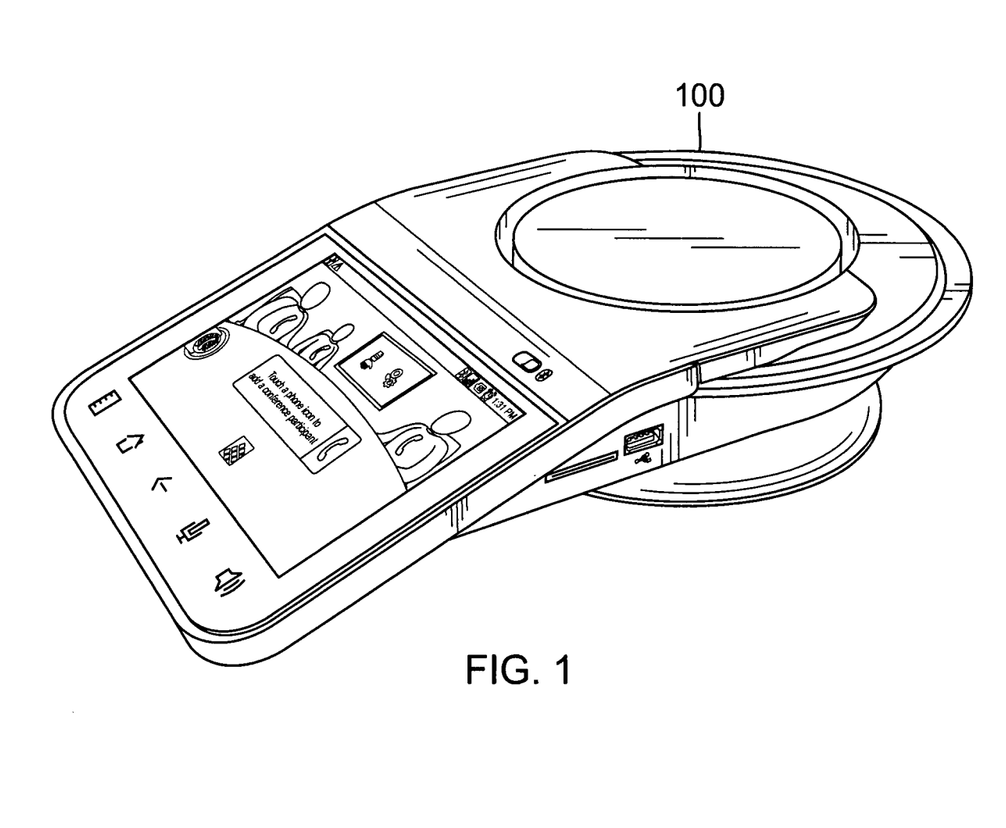
FIG. 1 is an exemplary embodiment of a collaboration appliance in accordance with one or more aspects of the present disclosure.
Figure 2:
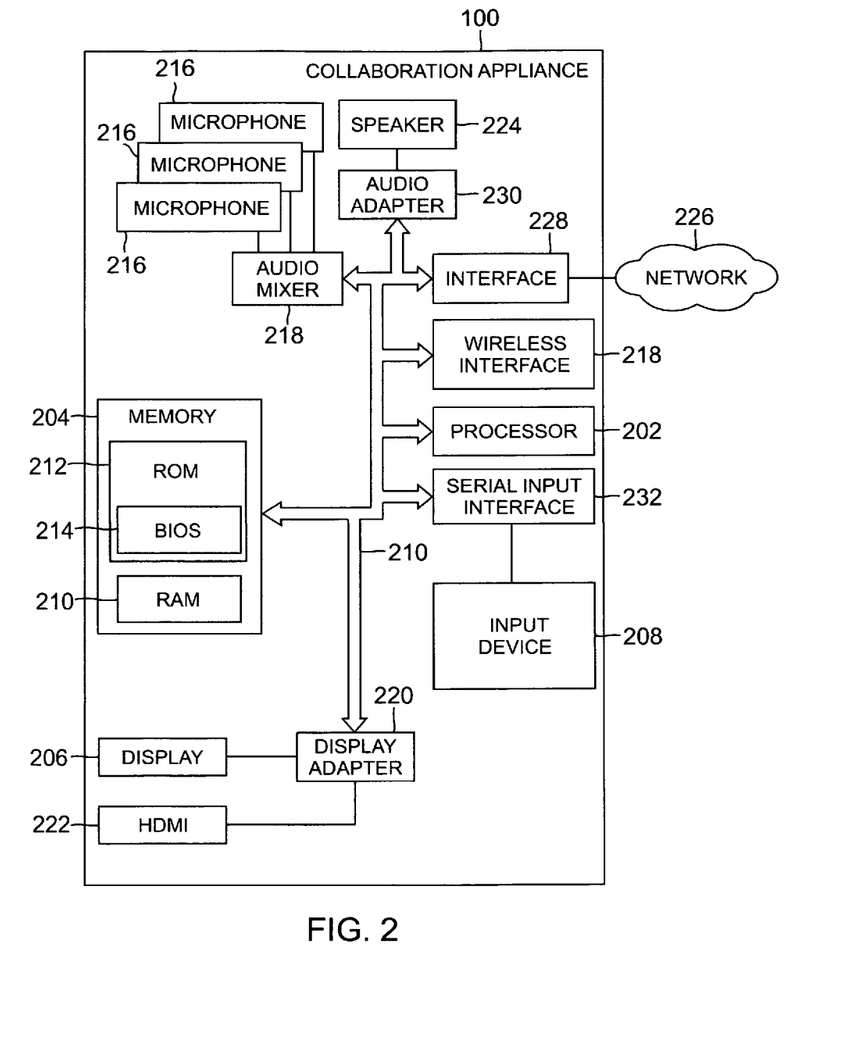
FIG. 2 is a block diagram showing illustrative hardware and software components of the collaboration appliance in accordance with one or more aspects of the present disclosure.

Referring to FIG. 1, an exemplary embodiment of a collaboration appliance 100 in accordance with one or more aspects of the present disclosure is provided. While being described as primarily a collaboration appliance 100, those skilled in the relevant art will appreciate that it can also be referred to as an apparatus or device and further be called a conference phone or the like. The appliance 100 can come in a variety of different shapes and forms. FIG. 2 is a block diagram showing illustrative hardware and software components of the collaboration appliance 100 in accordance with one or more aspects of the present disclosure is provided. The collaboration appliance 100 can include a processor 202 for implementing logic, memory 204, a display 206, and an input device 208. A system bus 210 can be used for video and audio data as well as propagating signals for processing the video and audio.

On the display 206 of the collaboration appliance 100, a touch-screen interface is provided. The display 206 can be a color multi-touch liquid crystal display (LCD) that provides a graphical user interface (GUI) for the collaboration appliance 100. A HDMI type A interface 222 can provide the ability to drive an external high resolution projector or monitor in the room. The display 206 can be connected to a display adapter 220. The display adapter 220 can receive information for display from the bus 210. The display 206 can also be used as an input device 208. The input device 208 can be connected to the system bus 210 through a serial input interface 232.

With reference now to the memory 204, the collaboration appliance 100 typically includes both volatile memory, for example RAM 210, and non-volatile memory, for example ROM 212, Flash Memory, or the like. The non-volatile portion of the memory 212 can be used to store persistent information which should not be lost when the collaboration appliance 100 is powered down. Within the ROM 212, can be BIOS 214 for defining a firmware interface. Within the memory 204, the collaboration appliance 100 can include an operating system (OS) stored in the RAM 210, which can manage programs. The OS can reside in the memory 204 and be executed on the processor 202. An OS such as Android™ or Windows 7 Mobile® can be used. Other more traditional OSs can also be used by the collaboration appliance 100. Applications for implementing the conference call user interface can be loaded into memory 204 and run on or in association with the OS. While described in the shown embodiment as software, the conference call user interface can be implemented in software, hardware or both.

The collaboration appliance 100 can have an array of microphones 216 built-in as with any standard conference phone. The audio from the microphones 216 can be provided to the audio mixer 218. The collaboration appliance 100 can further include a wireless interface 218. The wireless interface 218 can be used to search for wireless devices that are nearby that can provide presentations or other materials that can be uploaded to the collaboration appliance 100. The collaboration appliance 100 can include a speaker 224. The speaker 224 can propagate incoming audio received from the local area network 226 through the interface 228. These communications can then be provided over the bus 210 to the audio adapter 230. A camera can also be provided either as a part of the collaboration appliance 100 or an attachment.

Figure 3:
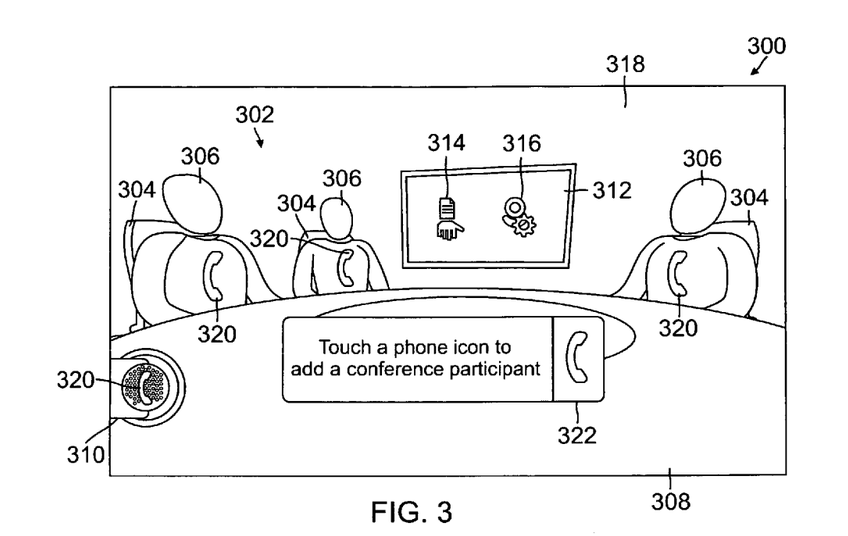
FIG. 3 is an exemplary conference call user interface depicting an initial startup window in accordance with one or more aspects of the present disclosure.

Turning now to FIG. 3, an exemplary conference call user interface 300 depicting an initial startup window in accordance with one or more aspects of the present disclosure is provided. Various embodiments of the user interface 300 can be programmed using an object-oriented programming language, such as SmallTalk, Java, C++, Ada, or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program render aspects of a GUI or perform other functions. Various aspects of the disclosure can be implemented as programmed or non-programmed elements, or any combination thereof.

Within the conference call user interface 300, a meeting room 302 can be provided. The meeting room 302 can be displayed on the GUI using the color touch display 206 of the collaboration appliance 100. Typically, the user interface 300 can provide a GUI for setting up audio and video conferences with up to eight parties. The meeting room 302 is easily understandable with the aim of enabling a first time or infrequent technologically challenged user to set up a conference call without any help. The conference call user interface 300 is designed to work with any type of collaboration appliance 100 that is able to connect multiple parties for either audio conversations or audio plus video conversations. In addition, the interface 300 supports a device that is able to display presentation material on a monitor or projector that is connected to it, for example, slides or text documents.

The user interface 300 presents a three-dimensional representation of the meeting room 302 on the touch display 206 with typical meeting room fixtures. These fixtures can include a conference table 308, chairs 304 and monitor 312 on the wall. Through these fixtures, the intent is to mimic the room that the collaboration appliance 100 is actual residing in. These fixtures can be adjusted as well as the background 318 of the meeting room 302.

Surrounding the conference table 308 are avatars 306. The avatars 306 can be graphical representations of possible connected parties within the conference. The avatars 306 can also be provided in a three-dimensional form. The graphical representations can help coordinate information in a visual format. In one embodiment, the avatars 306 can be in the shape or outline of a human form. The avatars 306 can be any character or object and is not limited to those shown within FIG. 3. Real images or photos of the parties can be pasted into the body or heads of the avatars 306. In one embodiment, corporate logos can be displayed on the avatars 306 so that attendees can recognize companies and employees that they are speaking to.

In one embodiment, when incoming information is received from a party, their corresponding avatar 306 can provide indicators of the incoming information. For example, the avatar 306 can be illuminated or change patterns when incoming audio is received by the party. Other visual indicators can also be provided. In addition, when presentation materials are received from a party, the avatar 306 representing the party can also provide an indicator that the remote party is providing the presentation.

As shown in FIG. 3, the avatars 306 can display phone handset icons 320 on their chests. In other embodiments, the icons 320 can be displayed at most locations near the avatar 306. Initially, the avatars 306 represent potential conference participants as no participant or party has been established to communicate with. While three avatars 306 are shown, fewer or more can be provided within the conference call user interface 300. The user can scroll the display 206 when avatars 306 cannot be seen within a single view. When scrolled, the monitor 312 can be changed within the background 318 so that it can always be seen by the user. Alternatively, the avatars 306 can be displayed within a single view of the user interface 300.

The monitor 312 depicted on the far wall of the room can have two icons 314 and 316. Through the share document icon 314 and the video settings icon 316, presentations can be provided to a real monitor or projector in the room that is connected to the collaboration appliance 100 or to the other parties within the conference. Drag-and-drop techniques, known to those skilled in the relevant art, can be used to retrieve documents and provide them to the remote parties or the external monitor or projector. In one embodiment, opening a file for display on the external monitor or projector can be accomplished by pressing the share document icon 314 on the monitor 312 pictured in the three-dimensional meeting room 302. When the icon 314 is pressed, a file browser can open that allows the user to browse and select the desired file either on a local USB drive, SD card or on the corporate network the collaboration appliance 100 is attached to.

The user can open the file which then automatically displays the file on the external monitor or projector. If the user wishes to display both the presentation file and the video conferencing windows of the external participants, they can press the video settings icon 314 on the monitor 312 in the meeting room 302 on the local touch display 206. The user can stop displaying the presentation file by pressing the share document icon 314 on the monitor 312 in the meeting room 302 on the local touch display 206. The video settings icon 316 can be used to stop displaying the video on the monitor.

In the foreground and to one side of the user interface 300, a small representation 310 of the collaboration appliance 100 with the same phone handset icon 320 on it can be presented. The representative collaboration appliance 310 can mimic the same shape as the collaboration appliance 100. Through the representative collaboration appliance 310, the collaboration appliance 100 can provide the user an intuitive feel for dialing or receiving calls from remote parties.

The user can begin the conference by actuating the phone icons 320 either on the avatar 306 or the representative collaboration appliance 310. As shown in FIG. 3, a dialogue message 322 can be displayed describing how to start a conference, for example, "Touch a phone icon to add a conference participant." This can also be provided through an audio message. Each avatar 306, when not in use, can be used to start the conference. In one embodiment, when the avatar 306 is lighted as green, the avatar 306 is in use and another avatar 306 should be selected to add a party. The avatars 306, when in use, can also change such that the avatar 306 is shown as picking up the phone where the phone is near the avatar's 306 head. The user can initiate a conference call by pressing a phone handset icon 320 on one of the idle avatars 306 or the phone handset icon 320 on the representative collaboration appliance 310. Generally, the collaboration appliance 100 determines whether any avatars 306 are available that can be associated with a party. When no avatars 306 are available, an error message is provided and the addition of the party cannot be made.

Figure 4:
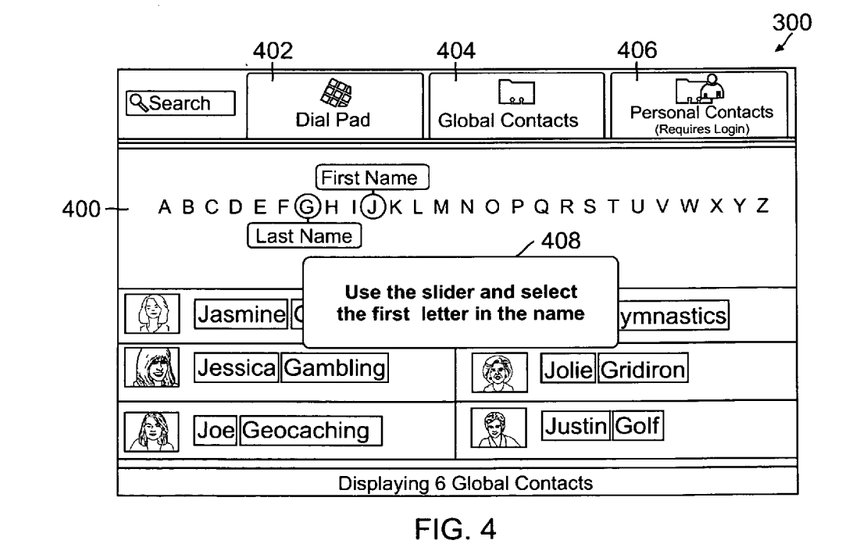
FIG. 4 is the exemplary user interface depicting a directory window in accordance with one or more aspects of the present disclosure.

When a phone icon 320 is actuated, the conference call user interface 300 can display a directory search system 400 as depicted in FIG. 4. Searching can be provided in a very intuitive manner through the GUI that is part of the search system 400. A dialogue box 408 can be provided to give the user instructions on how to search for a contact, for example, "Use the slider and select the first letter in the first name." This can be followed by "Use the slider and select the first letter in the last name." The search system 400 can employ a first letter of a first name combined with a first letter of a last name to quickly find contacts to dial without the use of a keyboard. Each letter can be associated with a pointer that is slidable along alphabet identifiers. By filtering contacts within the directory using the first letter of the first name and first letter of the last names, the user can retrieve a short list of potential contacts that the user wishes to retrieve information about.

Contacts can also be searched through a dial pad 402 offered within the user interface 300. The dial pad 402 can provide a numerical keypad implemented through the touch display 206 of the collaboration appliance 100. In one embodiment, global contacts 404 can be provided to search for a participant in the conference. The global contacts 404 typically can be setup with a company database that can be stored outside of the collaboration appliance 100. The global contacts can refer to any type of directory whereby names are stored and is not limited to a company. Personal contacts 406 can also be searched by the user. Generally, this can require a login to the user's contact application such as Microsoft® Outlook, Lotus® Notes® or other contact management application. The login typically requires a username and password combination to be entered. Those skilled in the relevant art will appreciate that there are many ways to find contacts.

After finding the desired contact, the user can press on the contact's entry in the directory window. This can open a list of phone numbers for the contact. The user can dial the desired number by pressing it in the list of numbers, which causes the directory window to disappear and the main conference window to reappear on the collaboration appliance 100. When the contact is found, the contact is associated with an avatar 306.

Figure 5:
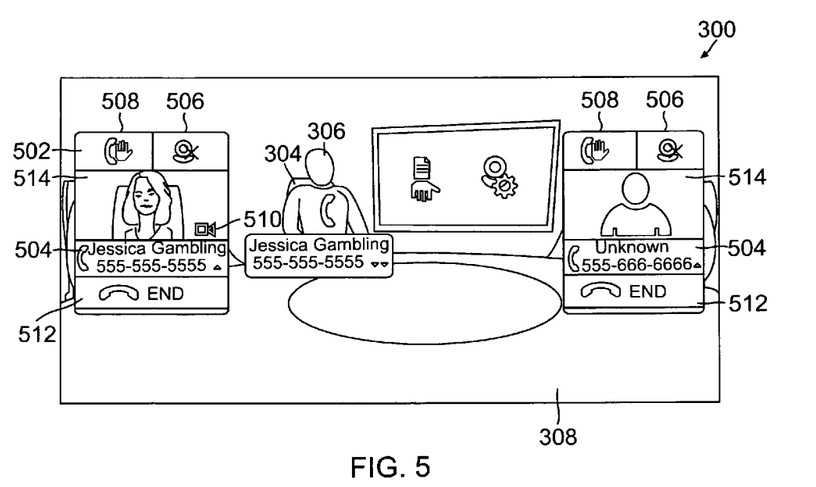
FIG. 5 is the exemplary user interface depicting a participant information panel in accordance with one or more aspects of the present disclosure.

Upon returning to the home screen, the avatar 306 that was pressed to initiate the call, or the avatar 306 assigned when pressing the phone icon 320 on the representative collaboration appliance 310, can display a rectangular panel in front of it. FIG. 5 is the exemplary interface 300 depicting a participant information panel 502 in accordance with one or more aspects of the present disclosure. The panel 502 can display the name and number 504 of the connected party, their picture 514, if the directory contained a picture for them, and call handling buttons, which can be used to perform actions. In one embodiment, the three call handling buttons can include an "Escalate to Video" option 506, a "Hold" option 508 and an "End Call" option 512.

When the number of the party was manually dialed and is not a contact within the directory, typically the name 504 displays "Unknown" along with the number. The picture area 514 can be left blank as shown using the party associated with 555-666-6666. After the far end has answered, the collaboration appliance 100 can determine if the called party is capable of participating via video conference. A blinking video camera icon 510 can appear overlaid on top of the called party's picture area 514 as shown using the party associated with 555-555-5555. The user can turn on video conferencing with the called party by clicking on the "Escalate to Video" option 506 in the panel 502.

After the video has been successfully enabled with the party, the video camera icon 510 can turn green or other color to indicate that the video is being received. The "Escalate to Video" option 506 can then change to indicate a "De-escalate from Video" option 506, represented in FIG. 5 as a camera having a cross. The user can turn off the video portion of the conference for that participant and revert back to audio by pressing the "De-escalate from Video" option 506.

After a pre-determined period of time, the participant information panel 502 can shrink to a small name plate that only displays the called party's name and number and no picture or call handling buttons. The pre-determined period of time can be adjusted by the user, for example, three seconds can be used as the pre-determined period of time. By shrinking the panel 502, the clutter on the display 206 can be reduced. The panel 502 on the conference call user interface 300, at any time while the call is active, can be expanded to its full panel size to expose the call handling buttons.

The user can place a party on hold by pressing the "Hold" option 508 within the full size panel 502. The user can also hang up the call by pressing the "End Call" option 512 within the panel 502. When pressed, both the audio and video is disconnected. The call state of a conference participant, such as on hold, video connected, etc. can be depicted by altering the appearance of that participant's avatar 306. For example, a participant on hold can be represented by turning the avatar 306 around backwards. In a similar manner, an indication that a participant is video connected can be displayed. For example, a depiction of a video camera on the table 308 top pointing at the avatar 306 can appear. Those skilled in the relevant art will appreciate that other actions can be provided within the panel 502 and those shown within FIG. 5 are not intended to be limiting to the present scope of this disclosure.

At any point, the user can add a participant by pressing the phone handset icon 320 on an idle avatar 306 and then go through the same process as described above to call them. Once the call is connected, the caller will automatically be added to the conference call with the other participants. Alternatively, the phone icon 320 on the representative collaboration appliance 310 can be used.

In one embodiment, the video received from the remote parties can be displayed instead of the avatars 306. The collaboration appliance 100 can also provide received audio and video from the parties to other parties involved with the conference. In addition, video and audio received by the collaboration appliance 100 can be provided to the other parties.

Figure 6:
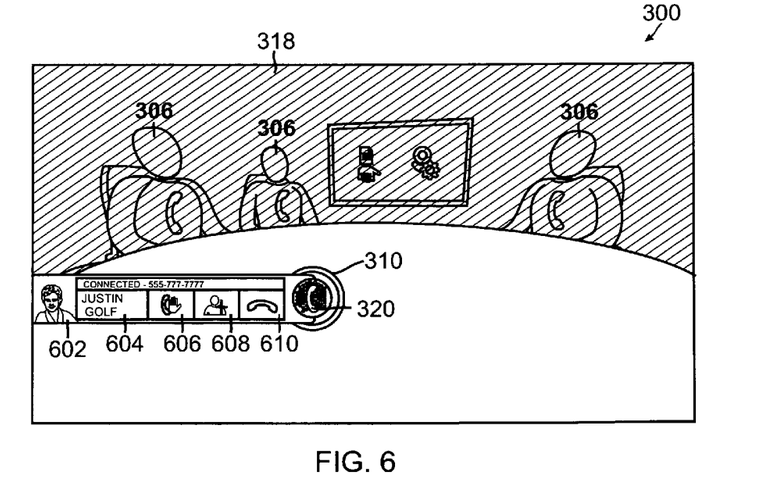
FIG. 6 is the exemplary user interface depicting a call handling toolbar for outgoing calls on a consult line in accordance with one or more aspects of the present disclosure.

FIG. 6 is the exemplary user interface 300 depicting a call handling toolbar 602 for outgoing calls on a consult line in accordance with one or more aspects of the present disclosure. When the phone icon 320 is actuated through the representative collaboration appliance 310, the call handling toolbar 602 is opened. The call handling toolbar 602 can be separate from the avatars 306 and provide a separate consult line. Touching the phone handset icon 320 on the call handling toolbar 602 causes a directory search system 400 to open in the same manner as pressing the phone handset icon 320 on one of the avatars 306. Within the system 400, the user can search for a contact and then dials them as described above.

When the chosen contact has been dialed, the search system 400 closes and the call handling toolbar 602 can be expanded horizontally or vertically containing call handling buttons as well as the call state, dialed contact's name 604, number and picture. In one embodiment, the background 318 on the display 206 can have a blurred and darkened effect applied to draw the user's attention to the toolbar 602 making it clear that the active call is being managed through the call handling toolbar 602. Generally, the participants on the conference call cannot hear the conversation between the user and the person on the consult line.

Through the call handling toolbar 602, the user can be presented with a "Hold" option 606, "Add" option 608 and "Hang Up" option 610. The "Hold" option 606 can allow the user of the collaboration appliance 100 to place the party on hold whereby the user is now connected back with the conferenced participants represented by the avatars 306 in the GUI and the user on the consult line is being held. When the user on the consult line is on hold, the "Hold" option 606 switches to a "Retrieve from Hold" option. The user can switch back to the person on the consult line by retrieving them from hold, which removes the user from the conference and allows them to speak to the person on the consult line again. The participants in the conference can still hear each other but do not hear the conversation between the user and the person on the consult line. The user can use the "Hold" option 606 and "Retrieve from Hold" option to switch back and forth between the conference participants and the person on the consult line. The "Add" option 608 is used to add the person on the consult line to the conference i.e. conference them together with the other participants in the conference. When the "Add" option 608 is invoked, the call handling toolbar 602 closes and a participant panel 502 appears on one of the free avatars 306, as described earlier. The user then has the option of escalating the participants call to a video conference if the "Escalate to Video" option 506 is actuated in the panel 502. The "Hang Up" option 610 can allow the user to cancel with the connected party on the consult line. For example, the connected party "Justin Golf" can be dropped.

In one embodiment, if the call was initiated in the manner described above while there was at least one other party already connected, the connected parties would not hear the new call being set up. Typically, however, the parties already within the conference would be able to communicate with each other. As soon as the new participant was added to the conference, their audio can be added to the conference and they could then converse with the other participants of the conference call both external and in the room. If the user decided to place the call on hold by pressing the "Hold" option 606, the toolbar 602 can close and the background 318 would revert to its normal state, i.e. no longer darkened and blurred, and the user would be able to talk to the parties that were connected on the conference. In this manner, the user can switch back and forth between talking to the parties in the conference and the party on the toolbar 602 without one hearing the conversation with the other.

Through the call handling toolbar 602, a separate conversation with a caller or called party independent of the rest of the conference call participants can be made. Touching on a participant avatar 306 in the faded background 318 while connected to a call on the call handling toolbar 602 can automatically place the call on hold and allow the user to set up a call or talk to the parties already within the conference depending on whether the avatar 306 that was touched was free or already had a connected party associated with it.

Figure 7:
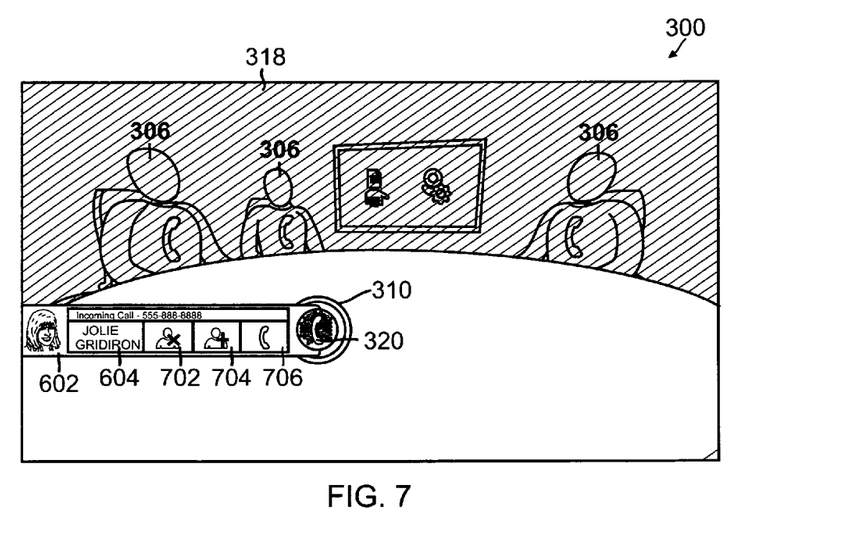
FIG. 7 is the exemplary user interface depicting the call handling toolbar for incoming calls on the consult line in accordance with one or more aspects of the present disclosure.

FIG. 7 is the exemplary user interface 300 depicting the call handling toolbar 602 for incoming calls on the consult line in accordance with one or more aspects of the present disclosure. When an incoming call is received, the representative collaboration appliance 310 can display the call handling toolbar 602. The background 318 can darken so that focus is presented on the call handling toolbar 602. For example, focus can be placed on the incoming call from "Jolie Gridiron" and her name 604 and number can be displayed.

When the user is connected with the incoming call, in one embodiment, the user can be provided with audio from the conference in a slightly lowered volume. The audio would be cancelled such that the party making the incoming call would not be able to hear it.

An "Ignore" option 702, "Add" option 704 and "Answer" option 706 can be provided within the call handling toolbar 602. The user can ignore the call by pressing the "Ignore" option 702. In one embodiment, the user can ignore the caller by selecting anywhere on the background 318 of the user interface 300. The "Add" option 704 can allow the user to include the caller into the conference along with the other parties. An introduction message can be provided by the collaboration appliance 100 that a new party has been introduced into the conference. This can be announced with the calling party's name or number or simply a tone. After adding the caller, a free avatar 306 can be associated with the caller.

In one embodiment, through the "Answer" option 706 of the call handling toolbar 602, the user can pick up the call without adding the caller to the conference. The call can remain on the call handling toolbar 602 and would not be heard by other conference participants. The parties in the conference can still talk to each other while the user is on a call with the caller. The people can still talk to each other, but the host, has now been removed from the conference. The user can then introduce the caller through the "Add" option 704 or hang up with the caller.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. An apparatus comprising:
    a touch display;
    at least one processor; and
    a memory operatively coupled to said processor, said memory storing program instructions that when executed by said processor, causes said processor to:
        display graphics representing a plurality of characters and said apparatus on a user interface provided on said touch display;
        display phone icons on said plurality of characters and said apparatus;
        connect with at least one device through said phone icons when said phone icons are actuated using said touch display;
        associate said at least one device with a character of said plurality of characters;
        display said character with an identifier of said at least one device on said user interface provided on said touch display, wherein connecting with said at least one device through said phone icons when said phone icons are actuated using said touch display comprises displaying a participant panel associated with said character having an "End Call" option, a "Hold" option, an "Escalate to Video" option, and a "De-escalate from Video" option facilitating said connection.

2. The apparatus of claim 1, wherein said memory storing program instructions, when executed by said processor, causes said processor to blacken or darken a background when said participant panel is displayed.

3. The apparatus of claim 1, wherein connecting with said at least one device through said phone icons when actuated using said touch display comprises providing a directory application to search for said at least one device.

4. The apparatus of claim 1, wherein said memory storing program instructions, when executed by said processor, causes said processor to:
    connect a device through said phone icons when said phone icons are actuated using said touch display;
    associate said device with an idle character of said plurality of characters; and
    display said idle character with an identifier of said device on said user interface provided on said touch display.

5. The apparatus of claim 4, wherein connecting said device is hidden from said at least one device already connected.

6. The apparatus of claim 1, wherein connecting with said at least one device through said phone icons when said phone icons are actuated using said touch display comprises determining whether said at least one device is capable of handling video.

* * * * *